US008932137B2

(12) United States Patent
Goldstein et al.

(10) Patent No.: US 8,932,137 B2
(45) Date of Patent: Jan. 13, 2015

(54) SYSTEM AND METHOD FOR SECURE AUTOMATED DATA COLLECTION

(75) Inventors: Floyd Goldstein, Grass Valley, CA (US); John Goodman, Reno, NV (US); Dung Hua, Sparks, NV (US); David C. Williams, Carson City, NV (US); Fred Nesimeier, Reno, NV (US)

(73) Assignee: IGT, Las Vegs, NV (US)

( * ) Notice: Subject to any disclaimer, the term of this patent is extended or adjusted under 35 U.S.C. 154(b) by 1307 days.

(21) Appl. No.: 11/763,387

(22) Filed: Jun. 14, 2007

(65) Prior Publication Data

US 2008/0313636 A1 Dec. 18, 2008

(51) Int. Cl.
*G07F 17/00* (2006.01)

(52) U.S. Cl.
CPC ............ *G06F 17/3234* (2013.01); *G06F 17/32* (2013.01)
USPC ............ 463/42

(58) Field of Classification Search
CPC .. G07F 17/3234; H04L 12/2602; H04L 67/26
USPC ............ 463/42
See application file for complete search history.

(56) References Cited

U.S. PATENT DOCUMENTS 5,655,961 A 8/1997 Acres et al.
5,741,183 A 4/1998 Acres et al.
5,833,540 A * 11/1998 Miodunski et al. ............ 463/42
6,319,125 B1 * 11/2001 Acres ............ 463/25
6,383,076 B1 * 5/2002 Tiedeken ............ 463/40
6,565,434 B1 * 5/2003 Acres ............ 463/25
6,638,170 B1 10/2003 Crumby
6,685,567 B2 2/2004 Cockerille et al.
6,826,167 B2 * 11/2004 Osafune et al. ............ 370/338
6,875,110 B1 4/2005 Crumby
7,318,010 B2 1/2008 Anderson
2002/0187825 A1 * 12/2002 Tracy et al. ............ 463/17
2003/0217138 A1 * 11/2003 Shimba et al. ............ 709/223
2004/0002385 A1 1/2004 Nguyen
2004/0048669 A1 3/2004 Rowe (Continued)

FOREIGN PATENT DOCUMENTS

AU 2008262128 12/2008
GB 2459815 11/2009

(Continued)

OTHER PUBLICATIONS

International Search Report and Written Opinion dated Sep. 24, 2008, from Application No. PCT/US2008/064557.

(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

The invention provides for an automated data collection having an endpoint coupled to at least one gaming machine to collect data from the at least one gaming machine, at least one concentrator in communication with the endpoint via a personal area network to obtain the data from the endpoint, and at least one remote collection server in communication with the at least one concentrator to receive the data from the at least one concentrator, wherein the data is pushed from the endpoint to the at least one remote collection server at predefined time intervals without interrupting game play on the at least one gaming machine.

24 Claims, 5 Drawing Sheets

(56) References Cited

U.S. PATENT DOCUMENTS

| | | | | |
|---|---|---|---|---|
| 2005/0130732 | A1* | 6/2005 | Rothschild et al. | 463/20 |
| 2005/0148393 | A1* | 7/2005 | Crumby | 463/42 |
| 2005/0261058 | A1 | 11/2005 | Nguyen et al. | |
| 2005/0281207 | A1 | 12/2005 | Lee et al. | |
| 2006/0040743 | A1* | 2/2006 | Saffari et al. | 463/42 |
| 2006/0084502 | A1* | 4/2006 | Downs et al. | 463/29 |
| 2006/0258461 | A1* | 11/2006 | Bekman et al. | 463/42 |
| 2006/0268908 | A1 | 11/2006 | Wang et al. | |
| 2006/0291439 | A1* | 12/2006 | Yang et al. | 370/338 |
| 2007/0258386 | A1 | 11/2007 | Liu et al. | |
| 2008/0056261 | A1 | 3/2008 | Osborn et al. | |
| 2008/0287182 | A1* | 11/2008 | Aida | 463/25 |
| 2008/0313636 | A1 | 12/2008 | Goldstein et al. | |
| 2009/0253483 | A1* | 10/2009 | Pacey et al. | 463/20 |
| 2010/0016073 | A1 | 1/2010 | Goldstein et al. | |

FOREIGN PATENT DOCUMENTS

| | | |
|---|---|---|
| WO | 2004/054304 | 6/2004 |
| WO | 2008/154146 | 12/2008 |

OTHER PUBLICATIONS

International Preliminary Report on Patentability dated Dec. 17, 2009, from Application No. PCT/US2008/064557.

"RFC 4944", Sep. 2007, Network Working Group, all pages.

Ergen, S., "ZigBee/IEEE 802.15.4 Summary", Sep. 10, 2004, all pages.

Examination Report for Australian Application No. 2008262128, issued Jan. 30, 2013, 2 pages.

Final Office Action dated Jan. 24, 2012 issued in U.S. Appl. No. 12/364,459.

Office Action dated Aug. 8, 2011 issued in U.S. Appl. No. 12/364,459.

* cited by examiner

SYSTEM AND METHOD FOR SECURE AUTOMATED DATA COLLECTION

FIELD OF THE INVENTION

The present invention relates to the collection of data. More particularly, the present invention relates to the secure automated collection of data from gaming machine devices.

BACKGROUND OF THE INVENTION

Obtaining meter data from gaming machines is important to evaluate revenue generation. It is best to obtain the data on a daily basis to be able to analyze the gaming machine, theme response, and other revenue criteria. For example, if a carousel of gaming machines is not attracting players due to its location, it is best to know immediately so that the casino may change the location of the gaming machines. Additionally, if the players are not attracted to the theme of the game being played, the casino can switch out the games to a more attractive game of chance.

To obtain data from gaming machines, an employee must interrupt game play, open the gaming machine, and manually inspect the meters. This process is labor intensive and costly and the data is subject to human error. Additionally, game play must either be interrupted or the employee must wait for the gaming machine to be free.

Furthermore, a gaming or gaming machine company, such as IGT of Reno, Nev. may rely on the data for revenue generation from participation and/or non-participation games. The data may be important for the calculation of license fees, copyright royalties, and the like. Currently, gaming companies may not obtain the data from the gaming machines on a daily basis, thereby delaying revenue generation. Additionally, clients such as a casino may not want to readily share the data and the data may not be accurate.

BRIEF DESCRIPTION OF THE INVENTION

The invention relates to a wireless system and method to automatically and securely collect data. Data from a gaming machine may be collected by an endpoint, which relays the information to a concentrator via a personal area network at a predetermined time. The concentrator then calls a remote collection server to push the information to the server at a predetermined time.

In one embodiment, an endpoint may be coupled to at least one gaming machine to collect data from at least one gaming machine, at least one concentrator in communication with the endpoint via a personal area network to obtain the data from the endpoint, and at least one remote collection server in communication with the at least one concentrator to receive the data from the at least one concentrator, wherein the data is pushed from the endpoint to the at least one remote collection server at predefined time intervals without interrupting game play on the at least one gaming machine.

The invention further provides for a method for automatically collecting data from at least one gaming machine, comprising obtaining data for the at least one gaming machine by an endpoint, transmitting the data from the endpoint to a concentrator via a personal area network, initiating a call to the remote collection server by the concentrator, and pushing the data from the concentrator to a remote collection server when the call is answered by the remote collection server, wherein the data is pushed from the endpoint to the remote collection server at predefined time intervals without interrupting game play on the at least one gaming machine.

The present invention provides other hardware (such as gaming machines, table games, kiosks, network devices and components of such devices) configured to perform the methods of the invention, as well as software in machine-readable media (e.g., tangible media) to control devices to perform these methods.

These and other features of the present invention will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Embodiments of the present invention are described herein in the context of a system and method for secure automated data collection. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
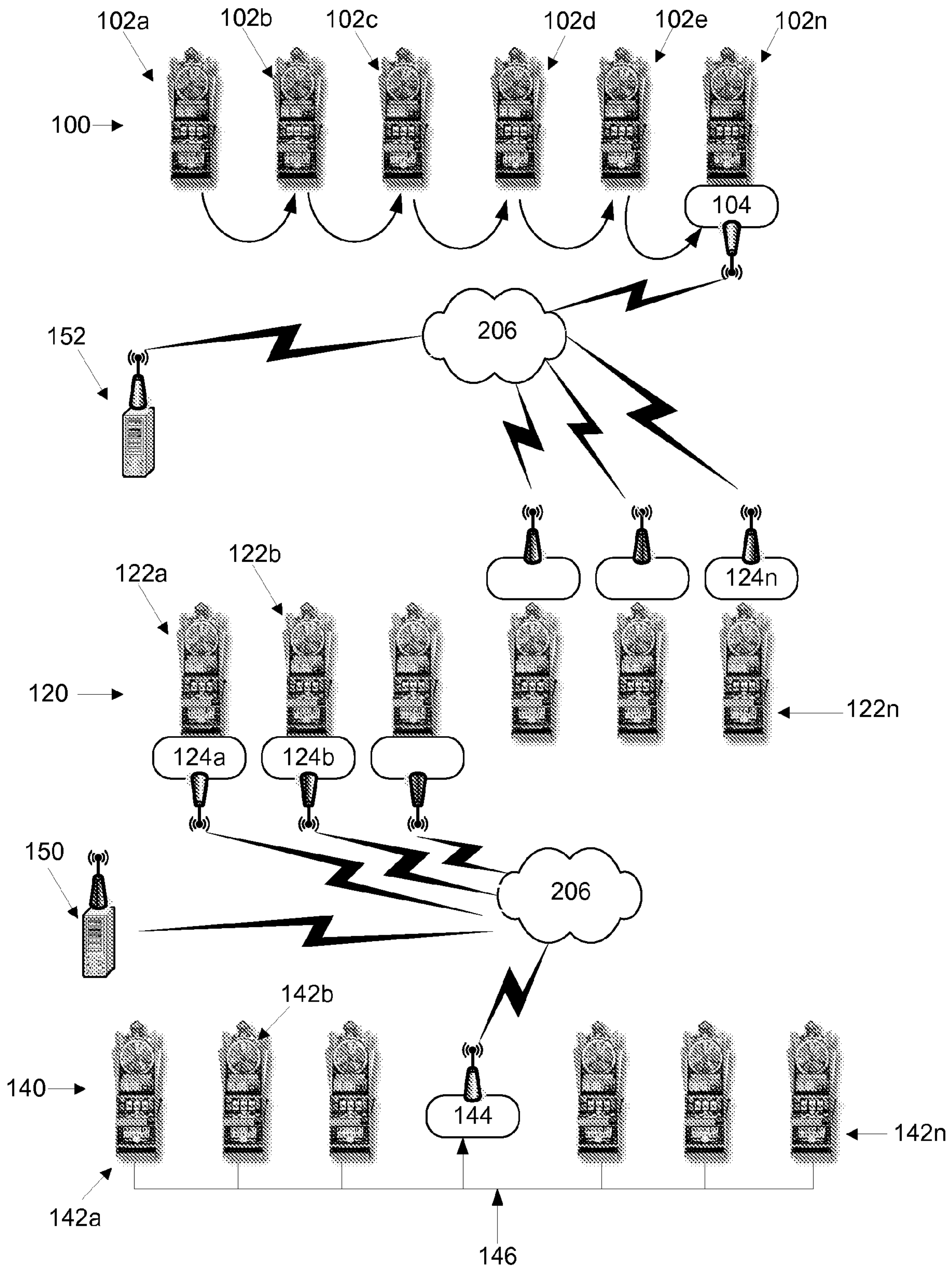
FIG. 1 illustrates a block diagram of a system to automatically collect data from a plurality of gaming machines.

The invention relates to a wireless system and method to automatically and securely collect data. FIG. 1 illustrates a block diagram of a system to automatically collect data from a plurality of gaming machines. An endpoint may be used to retrieve and collect data from the gaming machine, such as meter data, player tracking data, and any other data requested by a user. The endpoint may contain limited functionality to talk with other network devices and may not be configured to relay data to other endpoints. This allows the endpoint to have less memory and cost less to manufacture. However, the endpoints may be able to relay data to other endpoints for fault tolerance systems as further described below. A carousel as used herein describes a plurality of gaming machines grouped together in one location, such as a "bank" of gaming machines. Although FIG. 1 illustrates six gaming machines in each carousel, any number of gaming machines may be formed in a carousel. As illustrated in carousel 100, gaming machines 102*a-e*, 102*n* (where n is an integer) may be coupled to each other as a "series" or "line" topology such that the data may be transmitted from gaming machine 102*a* to gaming machine 102*b*, from gaming machine 102*b* to gaming machine 102*c*, and the like, where the data is collected at endpoint 104 in gaming machine 102*n*. Alternatively, as illustrated in carousel 120, each gaming machine 122*a*, 122*b*, 122*n* may have its own endpoint 124*a*, 124*b*, 124*n* to collect data from its respective gaming machine. With this "star" topology, the concentrator 150 serves as the hub of the star configuration.

In another embodiment, as illustrated in carousel 140, the endpoint 144 may be remote from the gaming machines 142*a*, 142*b*, 142*n*. Each gaming machine 142*a*, 142*b*, 142*n* may be communicatively coupled to endpoint 144 or similar to carousel 100, the data may be transmitted to a designated gaming machine, such as gaming machine 142*b*, to be transmitted to endpoint 144. The gaming machines 142*a*, 142*b*, 142*n* may be coupled to the endpoint through any known means including but not limited to a serial SAS 146, RS-232, universal serial bus, fiber loop, Ethernet, Data Collection Systems (DCS) port loop, direct wire connection, and the like.

The data collected from the endpoints 104, 124*a,b,n*, 144 may be used for a variety of reasons such as product marketing, theme response, and revenue analysis. The data may also be used to calculate revenues received from participation games, licensee fees, copyright fees, and the like. The meter data collected from the participation games may be used to evaluate the location of the gaming machine carousels, the game of chance played on the gaming machines, and other criteria to determine the effectiveness of the gaming machines as well. However, a client may refuse to submit the data to the gaming or gaming machine company. Thus, it would be beneficial to present the data in a way that would benefit both the gaming or gaming machine company and the client such as a casino. Alternatively, the information may be used to incentivize the client to provide accurate data to the gaming machine company. For example, the data may include player tracking information to evaluate the players that play the gaming machines. This would benefit the casino by helping them determine, analyze, and facilitate high rollers. Additionally, the client may direct special services to players of machines indicating a large "coin in" to keep the player interested in playing the gaming machine.

The endpoints may collect the data from the gaming machines at predetermined time intervals such as once a day or several times a day. Alternatively, the endpoints may collect the information when an internal alarm is triggered. The endpoint 104 may have an internal alarm (illustrated in FIG. 2) to signal the collection of data from the gaming machines and to push or transmit the data to the remote gateway or concentrator 152. The time intervals at which the endpoints 104, 124*a-n*, 144 communicate with the concentrators 152, 150 may be intentionally varied or randomized in order to increase system security.

Figure 2:
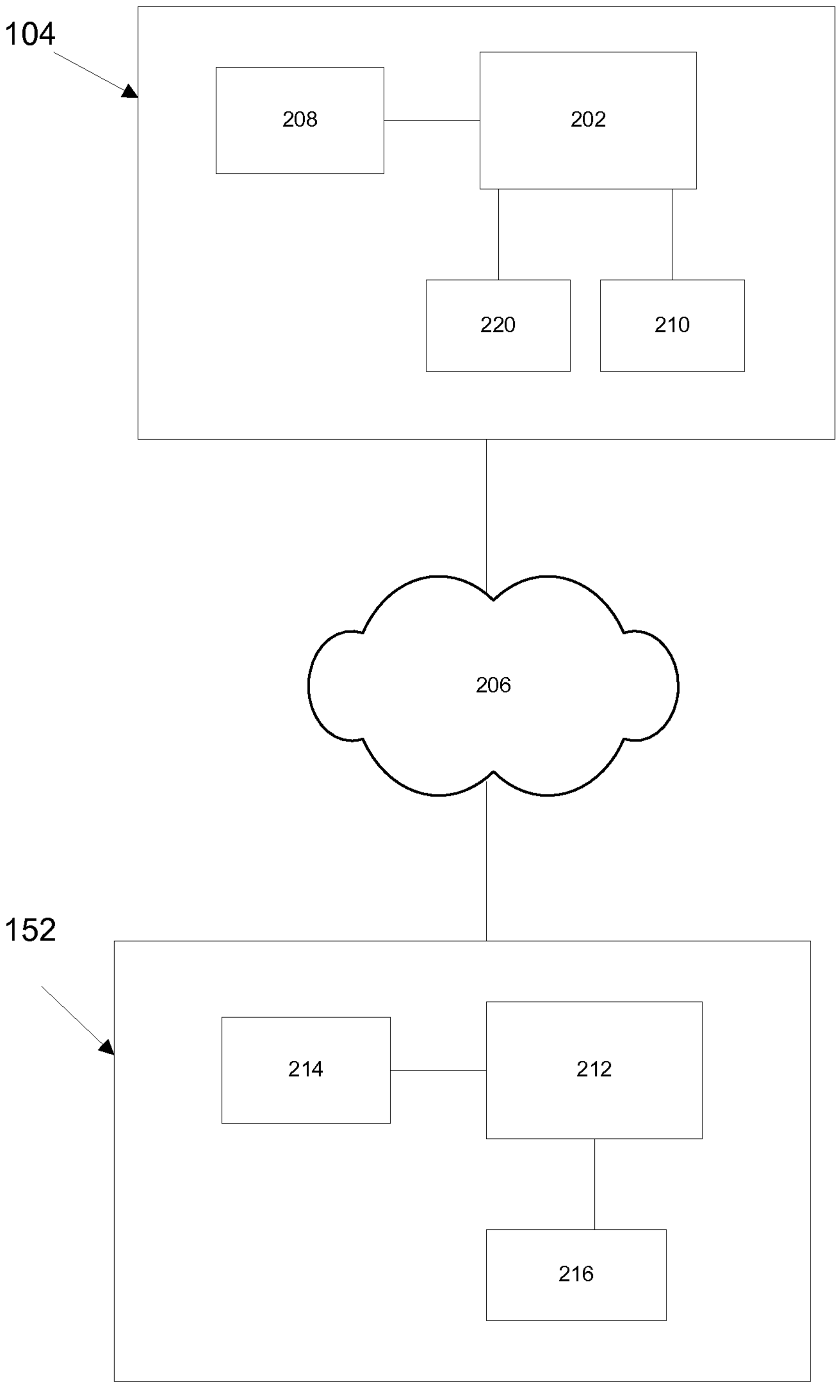
FIG. 2 is a block diagram of an endpoint and concentrator.

FIG. 2 is a block diagram of an endpoint and concentrator. Parts of the endpoint and remote gateway or concentrator will be described though it is not intended to be limiting as other hardware may be used as necessary such as a general input/output port, universal serial bus port, non-volatile random access memory, field programmable gate arrays, and the like. The endpoint 104 may be communicatively coupled to the concentrator 152 via a wireless personal area network (PAN) 206 such as any known communication protocols including SAS, G2S, or others required to interoperate with the industry-standard communication protocols prescribed by the Gaming Standards Association. The endpoint 104 may be any ZigBee device such as the XBee™ and XBee-PRO™ ZigBee modules sold by MaxStream of Orem, Utah. The endpoint 104 may have a processor 202 to receive and process the data signals from the gaming machines and/or concentrator 152. The processor 202 or (any other logic device) may be configured to implement a filter to enable the queries of the gaming machine meters and disable all other messages, in particular, transmission of commands to the game which could affect game operation or settings. Alternatively, or additionally, the endpoint may be programmed to not interrupt or control game play on the gaming machine. Thus, data may be collected without interrupting game play on the gaming machine.

Prior to being transmitted, the data signals may be encrypted to increase security. Any known means such as advanced encryption standard (AES), data encryption standard (DES), secure shell (SSH), secure socket layer (SSL) or transport layer security (TLS), and the like may be used.

The endpoint 104 may have a memory 208 coupled to the processor 202 to store any data. The processor 202 may be coupled to an alarm 210 the activation of which triggers the push of data to the concentrator 152. The alarm may be synchronized with the time in the concentrator 152 by a synchronizer 216.

The concentrator 152 may be any combination of known components or devices, including those providing suitable communication, networking, processing, and memory storage means, to provide the functionality required by a user. The concentrator 152 may have a processor 212 to receive and process the data signals received from the endpoint 104 via the PAN 206. The processor 212 may be coupled to a memory 214 and a synchronizer 216. The synchronizer 216 may be used to synchronize the alarm 210 on the endpoint 104 with the time on the synchronizer 216.

In addition to collecting meter data to gain information to increase revenue, it is important to attract clients and customers to the gaming machines. To attract players, the synchronizer 216 may be used to synchronize visual and/or audio effects on the plurality of gaming machines in a carousel. For example, the synchronizer may transmit a synchronization protocol signal to the endpoint to synchronize all the candles 50 and speakers 10, 12, 14 (illustrated in FIG. 5) in a way that would direct a player's eyes and ears to the carousel. This synchronization may also be used for other purposes, such as to signal the direction to a fire escape exit in case of a fire. For example, the candles may continuously light up starting with gaming machines 102*c* and 102*d*, followed by the candles from gaming machine 102*b* and 102*e*, which is then followed by candles from gaming machine 102*a* and 102*n*, and the pattern may be repeated. The candles may light up in different or the same colors. Simultaneously an audio message may be played to further attract a player's attention. In another example, the gaming machine displays 45 or 34 may be synchronized to illustrate a feature to attract a player. For example, an animated character may appear to "jump" from one gaming machine to the next to attract a player's attention. It will now be realized that any other means to synchronize visual or audio effects may be utilized.

The wireless PAN 206 may be any known network standard such as ZigBee. ZigBee is a specification for high level communication protocols using small, low-power digital radios based on the IEEE 802.15.4 standard for wireless PANs. It is intended for use in embedded applications requiring low data rates and low power consumption. ZigBee network topologies create a wireless PAN based on communicating over a selected channel. The ZigBee devices typically remain on the same channel for a significant period of time even if the channel becomes noisy or has detrimental outages and there previously was no mechanism for monitoring or switching channels. Thus, to monitor the channels for noise or outages, a "snooper" or channel agent 220 on the endpoint 104 may be used.

The channel agent 220 may communicate with the concentrator 152 to determine what channel the concentrator 152 is using and analyze the channel for noise, outages, and other criteria. The channel agent 220 may also analyze free unassigned communication channels and determine whether a channel change is necessary to increase transmission reliability. If signal quality on the channel the concentrator 152 is using falls below a predefined threshold such that a channel change is necessary, the channel agent 220 may send a signal to the concentrator 152 to use a different communication channel. Additionally, the channel agent 220 may continuously monitor the communication channels to pre-select a communication channel for a new device used within the ZigBee network.

Figure 3:
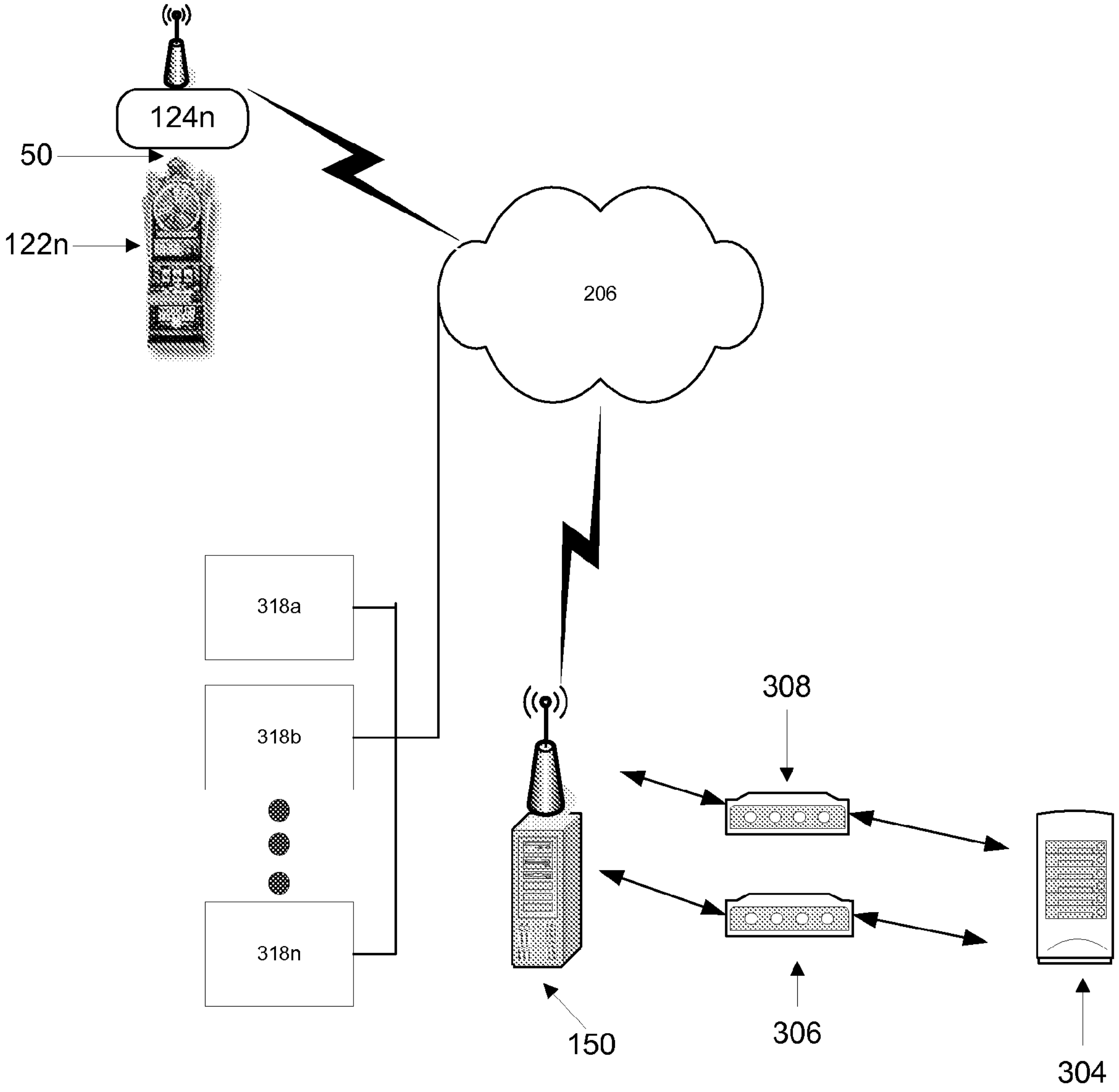
FIG. 3 illustrates a block diagram of the system to automatically collect data.

FIG. 3 illustrates a block diagram of the system to automatically collect data. The concentrator 150 may initiate a call with a remote collection server 304 to push the data from the concentrator 150 to the remote collection sever 304 at brief predefined time intervals. The concentrator 150 may communicate with the collection server 304 via a cellular modem 306. However, this is not meant to be limiting as other alternative means, such as an analog modem with Ethernet 308, public switch connection, and the like may also be used. The use of a cellular modem 306 increases security of the data since it is communicated over a cellular network and not a public Internet access network. Additionally, since the concentrator 150 initiates the call, the information may be transmitted briefly and infrequently, such as once a day, which makes it more difficult for a security breach to occur without knowing the predefined time intervals set by the concentrator 150. The time intervals at which the concentrator communicates with the remote collection server may be intentionally varied or randomized in order to increase system security. Security is further increased since it is not necessary that the concentrator 150 be in constant communication or connection with the collection server 304. Additionally, the information obtained by the remote collection server 304 will be accurate and current and the cost of manually reading the meters will be reduced.

The concentrator 150 may also synchronize its time with the collection server 304. The synchronizer 216 may synchronize the time in the concentrator 150 with the master timer on the collection server 304. Thus, the time on the collection server 304, concentrator 150, and endpoints 124*n* will be the same to ensure that the push of data from the endpoint to the collection server 304 occurs simultaneously.

One type of data that may be transmitted to the concentrator 150 is an attendant signal. Currently on gaming machines, when a player needs assistance, the player would press a call attendant button to light the candle 50 on the gaming machine 122*n*. Only when an attendant visibly notices the lighted candle will the player be helped. Thus, to allow for faster service, a player may press the call attendant button and the signal may be transmitted from the gaming machine 122*n* to the endpoint 124*n* and transmitted to the concentrator 150 via PAN 206. The concentrator 150 will receive the signal, process the signal as an attendant signal, and broadcast the transmission to at least one attendant receiver 318*a*, 318*b*, 318*n* via the wireless PAN 206 or any other network. The signal may include information to identify the gaming machine and location of the gaming machine. The signal may be received by the attendant receiver 318*a*, 318*b*, 318*n* in any known manner such as by visual, audio, vibration, or any other similar means. The signal may be broadcasted to several attendant receivers 318*a*, 318*b*, 318*n* and any attendant that is closest to the gaming machine may provide assistance. Alternatively, the signal may be broadcasted to attendant receivers that are assigned to specific gaming machines. This provides for faster and more efficient service to assist players and thereby increase player satisfaction. Furthermore, the faster the attendant service the more game play time the player will have thereby increasing revenue.

The endpoint 124*n* may be programmed to filter the data received from the gaming machine 122*n* as desired or requested. For example, should the casino only want the number of players that played that specific gaming machine 122*n* over a specific time interval, the endpoint 124*n* may filter out all other information and transmit only the requested information. Additionally, the endpoint 124*n* may have the ability to filter out gaming machine data signals from attendant signals to allow the attendant signals to be transmitted to the concentrator 150 immediately.

A fault tolerance system may be implemented in case of any faults or errors in transmission. For example, should the data transmission from the concentrator 150 to the remote collection server 304 not be possible on the cellular modem 306, the concentrator 150 may switch to the analog modem 308 to transmit the data to the collection server 304. Alternatively, the concentrator 150 may utilize any other means to transmit the data such as DSL, dial-up, an alternative cellular back-up network, and the like.

Fault tolerance redundancy systems may also be implemented by utilizing a plurality of devices to reroute the data communications to auxiliary devices. For example, referring to FIG. 1, if endpoint 104 is unable to transmit the data to concentrator 152, endpoint 104 may transmit the data to another endpoint such as endpoints 124*a* or 124*b* that may then transmit the data to concentrator 150. A fault tolerance system utilizing a redundancy of devices allows for the ability to redirect the data via alternative devices.

Figure 4:
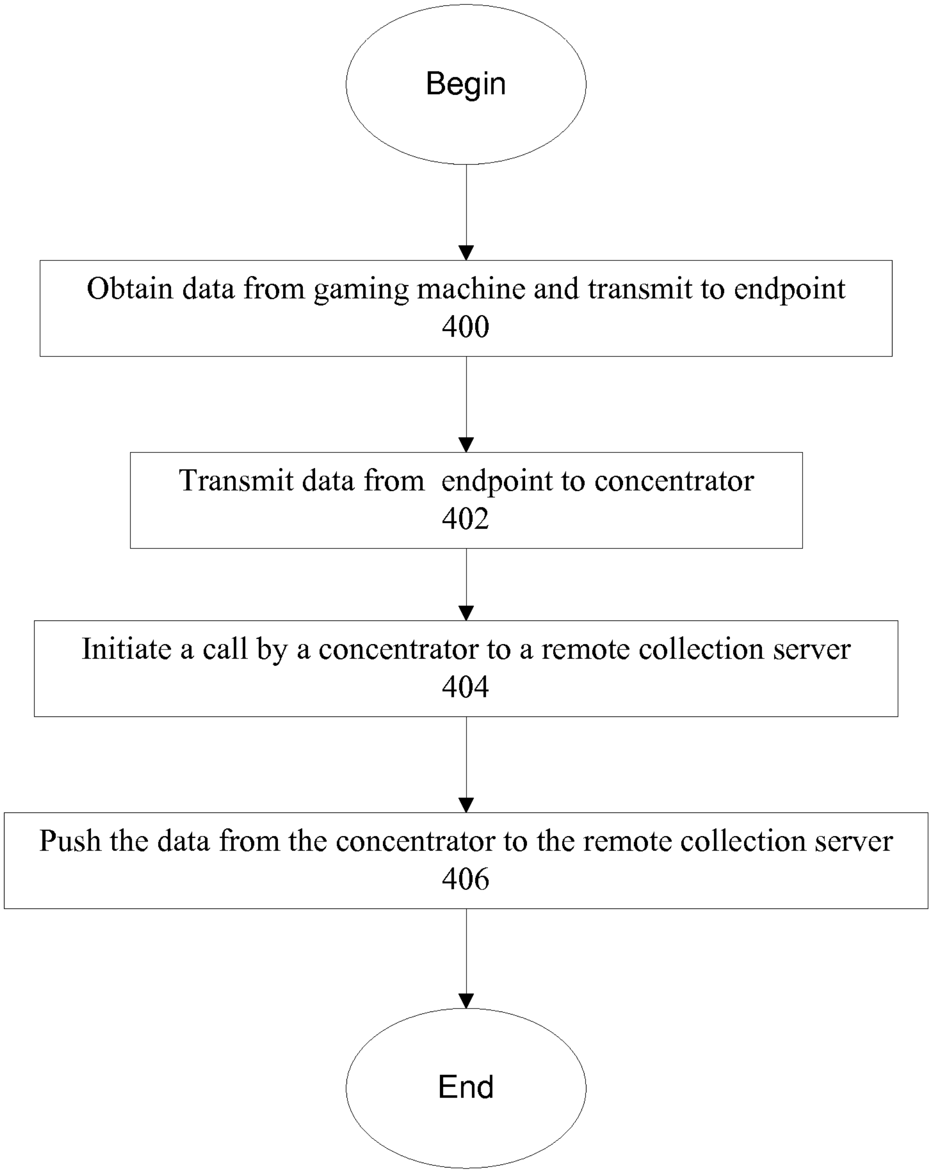
FIG. 4 is a flow diagram illustrating a method to automatically collect data.

FIG. 4 is a flow diagram illustrating a method to automatically collect data. Data may be sent from the gaming machine to the endpoint at 400. The endpoint may be used to retrieve and collect data from the gaming machine, such as meter data, player tracking data, license usage data and any other data requested by a user. An endpoint may be coupled to each individual gaming machine or one endpoint may be used in a carousel of gaming machines. The endpoint may be installed within a specific gaming machine or may be a remote endpoint device near the carousel.

The data collected from the endpoints may be used for a variety of reasons such as product marketing, theme response, and revenue analysis. The data may also be used to calculate revenues received from participation games, licensee fees, copyright fees, and the like. The meter data collected from the participation games may be used to evaluate the location of the gaming machine carousels, the game of chance played on the gaming machines, and other criteria to determine the effectiveness of the gaming machines as well.

However, a client may refuse to submit the data to the gaming or gaming machine company. Thus, it would be beneficial to present the data in a way that would benefit both the gaming or gaming machine company and the client such as a casino. Alternatively, the information may be used to incentivize the client to provide accurate data to the gaming machine company. For example, the data may include player tracking information to evaluate the players that play the gaming machines. This would benefit the casino by helping them determine, analyze, and facilitate high rollers. Additionally, the client may direct special services to players of machines indicating a large "coin in" to keep the player interested in playing the gaming machine.

The endpoints may collect the data from the gaming machines at predetermined time intervals such as once a day or several times a day. Alternatively, the endpoints may collect the information when an internal alarm is triggered. The endpoint may have an internal alarm to signal the collection of data from the gaming machines and to push or transmit the data to the concentrator. The processor may have a filter to enable the queries of the gaming machine meters and disable all other messages, in particular, transmission of commands to the game which could affect game operation or settings. Alternatively, the endpoint may be programmed to not interrupt or control game play on the gaming machine. Thus, data may be collected without interrupting game play on the gaming machine.

The data may be transmitted from the endpoint to a concentrator via a personal area network at 402 using any known protocols such as SAS, G2S, or the like. A synchronizer may synchronize the alarm on the endpoint with the time on the synchronizer to coordinate the push of data. Prior to being transmitted, the data signals may be encrypted by any known means such as advanced encryption standard (AES), data encryption standard (DES), secure shell (SSH), secure socket layer (SSL) or transport layer security (TLS), and the like.

The synchronizer may also synchronize visual and/or audio effects on the plurality of gaming machines in a carousel. For example, the synchronizer may transmit a synchronization protocol signal to the endpoint to synchronize all the candles and speakers in a way that would direct a player's eyes and ears to the carousel. This synchronization may also be used for other purposes such as to signal the direction to a fire escape exit in case of a fire. For example, the candles may be programmed to light up in a certain repeated pattern, the colors on the candles may be varied, audio messages may be played to attract a player's attention, and/or animation on the gaming machine displays may be synchronized to attract a player. For example, an animated character may appear to "jump" from one gaming machine to the next to attract a player's attention. It will now be realized that any other means to synchronize visual or audio effects may be utilized.

The wireless PAN may be any known network standard such as ZigBee. ZigBee is a specification for high level communication protocols using small, low-power digital radios based on the IEEE 802.15.4 standard for wireless PANs. It is intended for use in embedded applications requiring low data rates and low power consumption. ZigBee network topologies create a wireless PAN based on communicating over a selected channel. The ZigBee devices typically remain on the same channel for a significant period of time even if the channel becomes noisy or has detrimental outages and there currently is no mechanism for monitoring or switching channels. Thus, to monitor the channels for noise or outages, a "snooper" or channel agent on the endpoint may be used.

The channel agent may communicate with the concentrator to determine what channel the concentrator is using and analyze the channel for noise, outages, and other criteria. The channel agent may also analyze free unassigned communication channels and determine whether a channel change is necessary to increase transmission reliability. If signal quality on the channel the concentrator is using falls below a predefined threshold such that a channel change is necessary, the channel agent may send a signal to the concentrator to use a different communication channel. Additionally, the channel agent may continuously monitor the communication channels to pre-select a communication channel for a new device used within the ZigBee network.

The concentrator may initiate a call to a remote collection server at 404 to push the data from the concentrator to the remote collection sever at 406. This may be achieved at brief predefined intervals set by the user. The time intervals at which the concentrator communicates with the remote collection server may be intentionally varied or randomized in order to increase system security. The concentrator may communicate with the collection server via a cellular modem. However, this is not meant to be limiting as other alternative means, such as an analog modem with Ethernet, public switch connection, and the like may also be used. The use of a cellular modem increases security of the data since it is communicated over a cellular network and not a public Internet access network. Additionally, since the call is initiated by the concentrator, the information may be transmitted briefly and infrequently, such as once a day, which makes it more difficult for a security breach to occur without knowing the predefined time intervals set by the concentrator. Security is further increased since it is not necessary that the concentrator be in constant communication or connection with the collection server. Additionally, the information obtained by the remote collection server will be accurate and current and the cost of manually reading the meters will be reduced.

The concentrator may also synchronize its time with the collection server. The synchronizer may synchronize the time in the concentrator with the master timer on the collection server. Thus, the time on the collection server, concentrator, and endpoints will be the same to ensure that the push of data from the endpoint to the collection server occurs simultaneously.

One data signal that may be transmitted to the concentrator is an attendant signal. Currently on gaming machines, when a player needs assistance, the player would press a call attendant button to light the candle 40 on the gaming machine. Only when an attendant visibly notices the lighted candle will the player be helped. Thus, to allow for faster service, a player may press the call attendant button and the signal may be transmitted from the gaming machine to the endpoint and transmitted to the concentrator via PAN. The concentrator will receive the signal, process the signal as an attendant signal, and broadcast the transmission to at least one attendant receiver via the wireless PAN or any other network. The signal may include information to identify the gaming machine and location of the gaming machine. The signal may be received by the attendant receiver in any known manner such as by visual, audio, vibration, or any other similar means. The signal may be broadcasted to several attendant receivers and any attendant that is closest to the gaming machine may provide assistance. Alternatively, the signal may be broadcasted to attendant receivers that are assigned to specific gaming machines. This provides for faster and more efficient service to assist players and thereby increase player satisfaction. Furthermore, the faster the attendant service, the more game time the player will have thereby increasing revenue.

The endpoint may be programmed to filter the data received from the gaming machine as desired or requested. For example, should the casino only want the number of players that played that specific gaming machine over a specific time interval, the endpoint may filter out all other information and transmit only the requested information. Additionally, the endpoint may have the ability to filter out gaming machine data signals from attendant signals to allow the attendant signals to be transmitted to the concentrator immediately.

Figure 5:
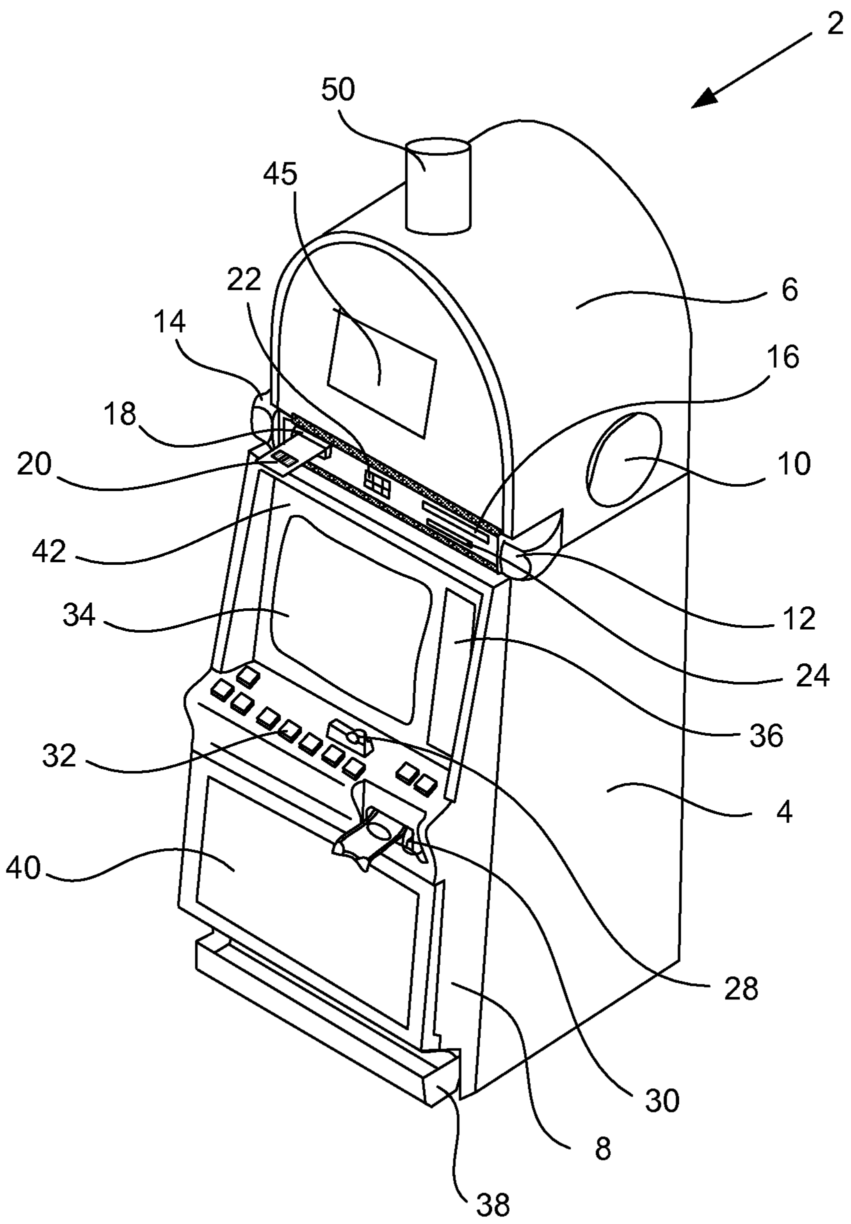
FIG. 5 is a diagram of an exemplary gaming machine.

FIG. 5 is a diagram of an exemplary gaming machine that may be used with embodiments of the present invention. Gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a candle or light 50, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 5. For example, the top box may contain a bonus wheel or a back-lit silk screened panel that may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in gaming computers typically have two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 5, when a user wishes to play the gaming machine 2, he or she inserts cash through the coin acceptor 28 or bill validator 30. Additionally, the bill validator may accept a printed ticket voucher that may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

While embodiments and applications of this invention have been shown and described, it would be apparent to those skilled in the art having the benefit of this disclosure that many more modifications than mentioned above are possible without departing from the inventive concepts herein.

What is claimed is:

1. A gaming machine system having automated data collection, comprising:

an endpoint, configured for communication with at least one gaming machine and configured to collect data from the at least one gaming machine, the endpoint includes an internal alarm that instructs the endpoint to transmit the collected data to at least one concentrator, the at least one concentrator including a synchronizer to synchronize the internal alarm and a concentrator time;

the at least one concentrator in communication with the endpoint via a personal area network to obtain the data from the endpoint; and at least one remote collection server in communication with the at least one concentrator to receive the data from the at least one concentrator, wherein the endpoint is configured to push the data to the at least one remote collection server at predefined time intervals based on a triggering of the internal alarm and without interrupting; game play on the at least one gaming machine, the endpoint is further configured to filter data received from the at least one gaming machine, and wherein the endpoint comprises a channel agent that is configured to perform an analysis of a plurality of communication channels in the personal area network by analyzing each communication channel for noise, outages, signal quality or transmission reliability.

2. The system of claim 1, wherein the endpoint is coupled to a plurality of gaming machines.

3. The system of claim 2, wherein the concentrator further comprising a synchronizer to synchronize a plurality of visual effects and a plurality of audio effects on the plurality of gaming machines.

4. The system of claim 1, wherein the endpoint collects the data at predetermined time intervals.

5. The system of claim 1, wherein the data is encrypted.

6. The system of claim 1, wherein the data is obtained from at least one meter device in the at least one gaming machine.

7. The system of claim 1, wherein the data is obtained from a player tracking device.

8. The system of claim 1, wherein the channel agent further comprises means for configured for:

determining, based on the analysis, that a communication channel should be changed; and initiating a communication channel change on the at least one concentrator.

9. The system of claim 1, wherein the data further includes an attendant signal.

10. The system of claim 9, wherein the attendant signal is transmitted to at least one attendant receiver via the personal area network.

11. The system of claim 9, wherein the attendant signal is transmitted to an assigned attendant receiver via the personal area network.

12. The system of claim 1, wherein the at least one remote collection server is in communication with the at east one concentrator via a cellular modem.

13. The system of claim 1, wherein the at least one remote collection server is in communication with the at least one concentrator via a public switch connection.

14. The system of claim 1, wherein the predefined time intervals are random time intervals.

15. The system of claim 1, wherein the endpoint is configured to function without interrupting same play on the at least one gaming machine.

16. The system of claim 1, wherein the analysis includes monitoring a signal on the communication channels and determining whether the signal quality falls below a predefined threshold value.

17. The system of claim 16, wherein the channel agent initiates a communication channel change on the at least one concentrator when the signal quality falls below the predefined threshold value.

18. The system of claim 1, wherein the endpoint is configured to filter in meter data and filter out other data and signals to ensure that game play is not interrupted.

19. A gaming machine system having automated data collection, comprising:

an endpoint configured for communication with a plurality of gaming machines, wherein the endpoint collects data from the plurality of gaming machines, the endpoint includes an internal alarm that instructs the endpoint to transmit the collected data to at least one concentrator;

the at least one concentrator in communication with the endpoint via a personal area network to obtain the data from the endpoint, wherein the at least one concentrator further comprises a synchronizer to synchronize and coordinate a plurality of visual effects and a plurality of audio effects on the plurality of gaming machines wherein the synchronizer is programmed to synchronize a time of the endpoint and of the synchronizer to push the data from the endpoint to the at least one concentrator; and at least one remote collection server in communication with the at least one concentrator to receive the data from the at least one concentrator, wherein the endpoint is configured to push the data to the at least one remote collection server at predefined time intervals based on a triggering of the internal alarm and without interrupting game play on the at least one gaming machine, wherein the endpoint comprises a channel agent that is configured to perform an analysis of a plurality of communication channels in the personal area network by analyzing each communication channel for noise, outages, signal quality or transmission reliability.

20. The gaming machine system of claim 19, wherein the synchronizer is configured to synchronize and coordinate displays of animation on the plurality of gaming machines.

21. The gaming machine system of claim 20, wherein the synchronizer is configured to synchronize and coordinate the displays of animation such that an animated character appears to jump front a first gaming machine to a second gaming machine.

22. The gaming machine system of claim 19, wherein the time is the predefined time intervals.

23. The gaming machine system of claim 19, wherein the synchronizer is programmed to synchronize a time of the concentrator and of the remote collection server to push the data from the concentrator to the remote collection server.

24. The gaming machine system of claim 23, the time is the predefined time intervals.

* * * * *